United States Patent [19]

Berg

[11] 4,226,652
[45] Oct. 7, 1980

[54] METHOD AND APPARATUS FOR JOINING A SEALING ELEMENT TO A CYLINDRICAL CONTAINER SLEEVE

[75] Inventor: Rolf Berg, Djursholm, Sweden

[73] Assignee: Assi Can Aktiebolag, Stockholm, Sweden

[21] Appl. No.: 966,989

[22] Filed: Dec. 6, 1978

[30] Foreign Application Priority Data

Jun. 6, 1978 [SE] Sweden ............................ 7806619

[51] Int. Cl.² ...................... B29C 27/08; B32B 31/20; B65B 7/28
[52] U.S. Cl. ...................................... 156/69; 53/329; 53/334; 53/420; 53/478; 156/73.5; 156/294; 156/499; 156/580
[58] Field of Search ................. 53/329, 334, 335, 420, 53/478; 156/69, 73.6, 281, 294, 494, 499, 580, 581; 228/2, 112

[56] References Cited

U.S. PATENT DOCUMENTS

| | | | |
|---|---|---|---|
| 3,074,837 | 1/1963 | Flax | 156/69 |
| 3,216,874 | 11/1965 | Brown | 156/69 |
| 3,446,688 | 5/1969 | Flax | 156/423 |
| 3,615,965 | 10/1971 | Smith et al. | 156/69 |
| 3,700,513 | 10/1972 | Haberhauer et al. | 156/69 |

*Primary Examiner*—John T. Goolkasian
*Assistant Examiner*—Robert A. Dawson
*Attorney, Agent, or Firm*—Sughrue, Rothwell, Mion, Zinn and Macpeak

[57] ABSTRACT

A container sleeve 1 having an inner coating 5 of a heat weldable plastics material is fitted with a closure element 2 having a collar 4 of meltable plastics material. The assembly is rotated while a hot welding shoe 35 is inserted through the open end of the sleeve and brought to bear against the collar, which melts the latter and fuses it to the tackified coating 5 to thereby provide a tightly sealed joint.

10 Claims, 4 Drawing Figures

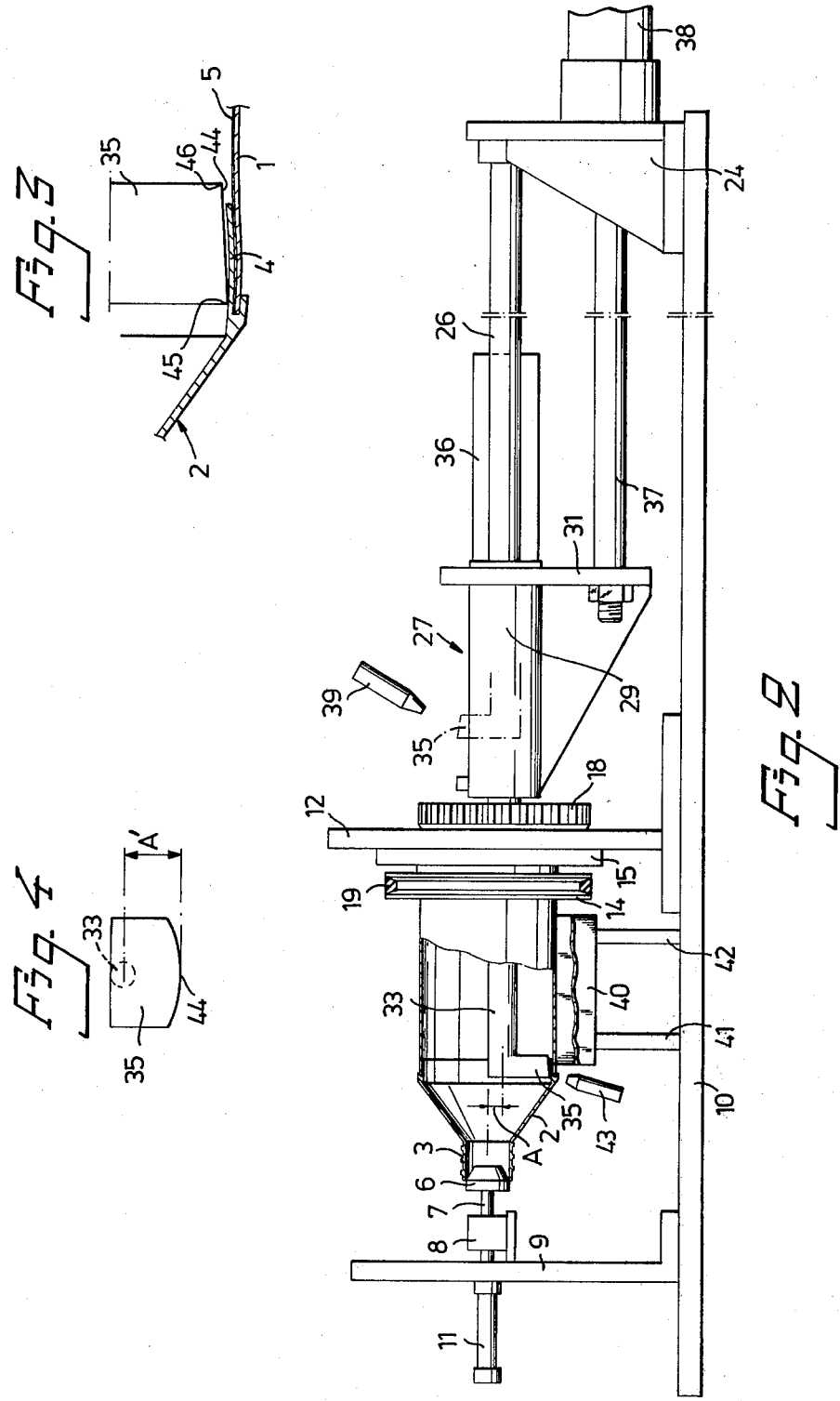

METHOD AND APPARATUS FOR JOINING A SEALING ELEMENT TO A CYLINDRICAL CONTAINER SLEEVE

BACKGROUND OF THE INVENTION

The present invention relates to a method and apparatus for joining a sealing or closure element to a cylindrical container sleeve, said sealing or closure element having a circular collar and being arranged to be introduced into one, open end of said sleeve into abutment with the inner wall thereof, and in which at least the collar comprises a heat-meltable plastics material.

The primary object of the invention is to provide a positive and tight seal between the sealing or closure element and the sleeve, irrespective of the type of meltable plastics material incorporated in the collar, and optionally also in the sleeve.

In the storage of certain liquids and oils, the closure elements need to be made of a high-density plastics and the container sleeves provided with an inner foil also comprising a high density plastics material. These plastics are extremely difficult to bond together quickly by heat-welding processes, and the invention is particularly, although not exclusively, concerned with work in connection with these plastics. The invention, however, can also be applied to advantage when a collar or a flange made of any meltable plastics material is to be joined to a ring-shaped inner end portion of a cylindrical container sleeve comprising uncoated or coated board, cardboard, paper, sheet-metal or the like.

SUMMARY OF THE INVENTION

The novel characteristic features of the method and apparatus according to the invention reside in the fact that the closure element is mounted on the container sleeve with the collar in abutment with the inner wall of said sleeve; in that the container sleeve and the closure element are rotated around the cylinder axis of said sleeve; in that at least one hot body having a temperature exceeding the melting point of the plastics material present in the collar is pressed against the collar; and in that the container sleeve is rotated until the plastics material in said collar has melted, whereafter the hot body is removed out of contact with the malted plastics material and the plastics material is thereafter permitted to solidify.

The aforementioned body, which is preferably maintained at a temperature much higher than the melting point of the plastics material in the collar, for example 500° to 600° C., melts the collar very quickly and a fluid ring of plastics material is formed, the ring being held at a substantially constant thickness as a result of the centrifugal forces created by rotation of the cylindrical sleeve and the closure element, said speed preferably lying within the range of 500 to 2000 r.p.m. The fluid ring of plastics material is brought, by the centrifugal force, into intimate contact with the container sleeve, and the plastics material will penetrate the pores in the wall of the container, thereby to provide a perfect seal. When the wall of the container is coated with a meltable plastics foil or a coating of a meltable plastics material the aforementioned intimate contact with the molten plastics will contribute to an effective transfer of heat to the surface of the container wall, thereby ensuring that said foil or said coating are brought at least to a tacky state, thereby to obtain a perfect joint.

Subsequent to the plastics material melting, the hot body is removed and the plastics permitted to solidify. Rotation of the closure element and the container sleeve is continued during at least the first part of the solidifying sequence or at least until the plastics materials have been converted to a very highly viscous state, in order to prevent undesirable migration of the plastics material.

So that the invention will be more readily understood and optional features thereof made apparent, an exemplary embodiment of the invention will now be described with reference to the accompanying schematic drawings.

BRIEF DESCRIPTION OF THE DRAWINGS

FIG. 2 is a side view of the apparatus illustrated in FIG. 1, FIG. 3 is a detailed view of the welding tool cooperating with the container closure elements, and FIG. 4 illustrates the welding tool as seen in the axial direction.

DETAILED DESCRIPTION OF THE PREFERRED EMBODIMENT

Figure 1:
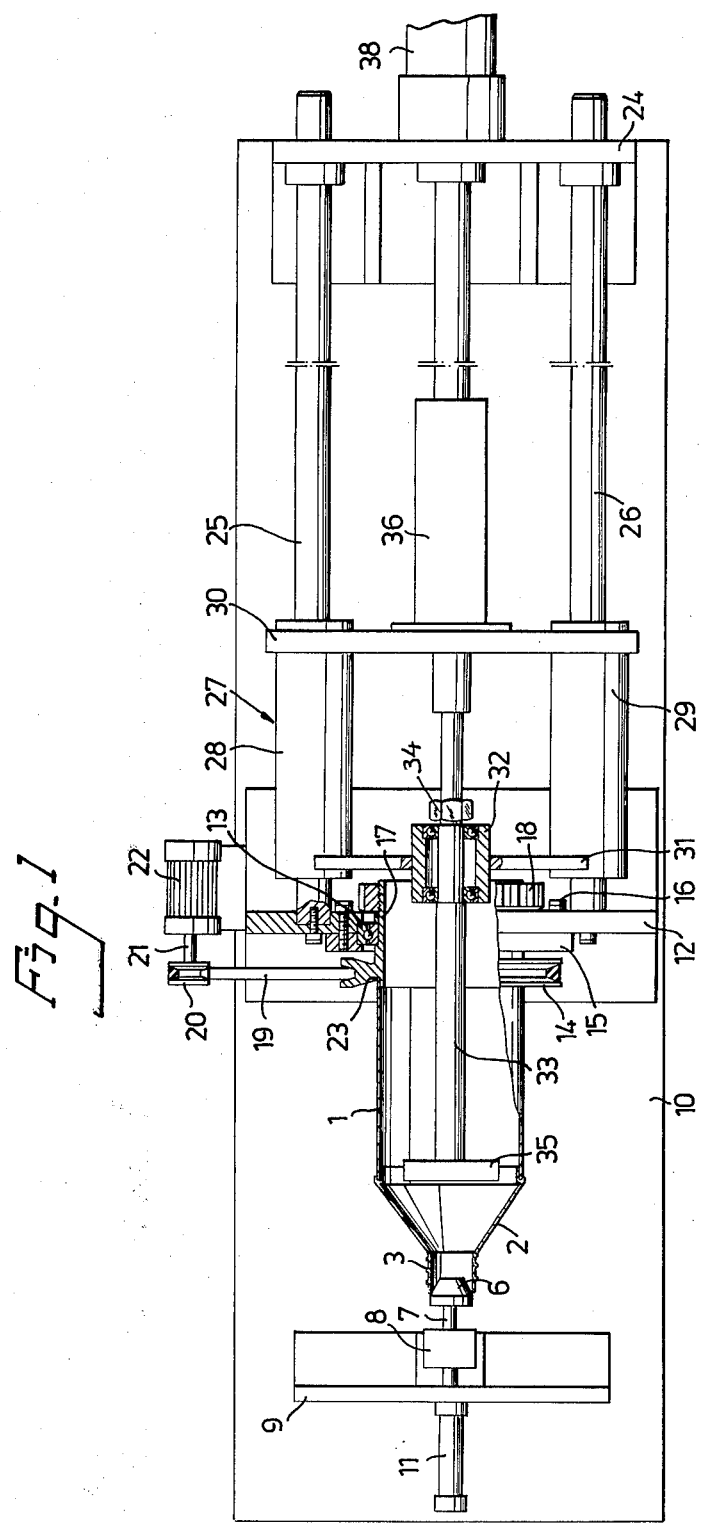
FIG. 1 is a top plan view of a partially cut away apparatus according to the invention with a container and a welding tool in a working position.

The container 1 which is to be provided with a sealing or closure element 2 is cylindrical and it is assumed that the inner surface of the container is provided with a coating of a heat-weldable plastics material. The coating may be, for example, a coating of a polyolefin resin sprayed on a paper or cardboard container, or a helically wound foil of plastics material. The material from which the container 1 is made, however, is not limiting to the manner in which the invention can be applied and, for example, it is possible to use a metal container or a plastics container.

In the illustrated embodiment the sealing or closure element 2 is of conical configuration and is provided with a neck 3 and a circular collar 4 (FIG. 3) which is intended to be inserted into an end opening of the cylindrical container 1 in a manner such as to retain the sealing element during the welding operation. The sealing element 2, however, may have any suitable form. Thus, the sealing element may have the form of a planar lid with a collar 4. The collar 4 is an essential feature and must be manufactured of a plastics material which can be brought to a tacky or liquid state by applying heat thereto, in order for it to be joined to a ring-shaped part on the inside of the end part of the container 1. Conveniently, the whole of the sealing element 2 is manufactured from such a plastics material, which may be, for example, a so-called high-density plastics. Further the material from which the collar is made must be such as to permit it to be joined to the inner surface of the container. Preferably this inner surface comprises a similar plastics to the plastics from which the collar 4 is made and in the illustrated embodiment is assumed to comprise a coating or foil 5 (FIG. 3).

The illustrated apparatus comprises a conical support body 6 carried by a shaft 7 which is freely rotatable in a bearing 8 carried by a bracket structure or console 9. The bracket structure 9 is attached at its lower end (by means not shown) to a bottom plate 10 which is common to the apparatus as a whole. The end of the shaft 7 remote from the support body 6 is connected to a pneumatic piston-cylinder arrangement 11 connected to a pressure source not shown. The pressure-cylinder arrangement 11 is of the double-acting type and is arranged to move the shaft 7 axially in bearing 8 and therewith also to move the support body 6. In FIGS. 1 and 2 the support body 6 is shown in its working position, i.e. displaced into the opening of the neck 3, from where it can be withdrawn to an inoperative position, out of contact with the neck 3.

A rotor 14 is journalled in a bearing 13 in a bracket structure 12, said bracket structure being mounted on the bottom plate 10 by means not shown. The bearing 13, which in the illustrated embodiment is a ball bearing, is pressure-held in the bracket structure 12 by means of a ring 15, which is attached by means of bolts 16. The rotor 14 has a hub 17 having a screw-threaded free end on which a locking ring 18 is mounted. The rotor 14 is provided with a groove for receiving a driving belt 19, said driving belt 19 extending over a drive wheel 20 which is also provided with a groove and which is mounted on the shaft 21 of a drive motor 22, for example a variable-speed electric motor. The rotor 14, which is driven round an axis of rotation which coincides with the axis of rotation of the support body 6, is provided on the surface thereof facing the support body 6 with a circular groove 23 or a circular collar for receiving the open end of the cylindrical container 1 remote from the sealing element 2. The purpose of the groove 23 or collar is to hold the end of the container in a given position and may, for example, comprise a plurality of guide pins or the like arranged to abut the inner surface of said container end and/or the outer surface thereof and to fix the position of the container 1, together with the support body 6. In the illustrated embodiment, the support body 6 urges the container 1 into good frictional contact with the rotor 14. When the motor 22 is energized, the rotary force will thus be transmitted between the rotor and the end of the container, and the container 1 will be caused to rotate about its axis at a speed determined by the motor and the gearing between the motor 22 and the rotor 14.

Arranged between the bracket structure 12 and a bracket structure 24 fixed to the bottom plate 10 by means not shown are two guides 25, 26 on which a carriage 27 is slidably arranged. The carriage 27 comprises two slide sleeves 28, 29 which move on the guides 25, 26, said sleeves 28, 29 being joined together by means of cross members 30, 31. The cross member 31 carries a bearing 32 in which a shaft 33 is mounted for rotation but is axially immovable. Mounted on the shaft 33 is a stop nut 34. The shaft 33 carries a welding device 35 on the left end thereof as seen in the FIGS. 1 and 2. In FIG. 2, the inoperative position of the welding device 35 in which it is withdrawn from the container 1 is shown in chain lines, and the operative position of said device, in which it is turned through 180 degrees, in full lines. In FIG. 1 the welding device 35 is shown rotated through 90 degrees from the inner, operative position shown in FIG. 2. The other end of the shaft 33 is connected to a rotary cylinder 36, for example a pneumatically-controlled cylinder arranged to rotate the shaft 33 between the inoperative and operative positions of the welding device 35, said angle of rotation being assumed here to be 180 degrees although said angle can be varied. The welding device is either rotated as it is moved axially into the container sleeve, or when the welding device is located in its working position opposite the collar 4. The cylinder 36 is mounted on the cross member 30 and compressed air is passed to said cylinder from a pressure source not shown. One end of a piston rod 37 is fixedly mounted to the bracket structure 31, while the other end of said piston rod is connected to a piston (not shown) in a pneumatic cylinder 38 which is fixedly connected to the bracket structure 24 and to which compressed air is supplied from a pressure source not shown. The cylinder 38 which is of the double-acting type, drives the carriage 27 forwards and backwards on the guides 25 and 26 between an inoperative position, in which the welding device 35 is located in the position shown in chain lines on FIG. 2, and a working position in which the welding device 35 is moved into the container 1 to the working position shown in full lines in FIG. 2.

The embodiment illustrated in FIG. 2 includes a burner nozzle 39 to which a combustable gas is supplied from a gas source not shown, to provide a flame which is directed against the welding device 35 in its withdrawn, inoperative position, so as to heat the welding device to a relatively high temperature, for example a temperature of 600° C. Although the temperature to which the device is heated may be varied within relatively wide limits, the said device must be hot enough to rapidly melt the plastics material in the collar 4. Also illustrated in FIG. 2 is a support 40 for the container 1, said support comprising a V-shaped plate (the forward side being shown partly cut away), which abuts the outside of the container 1 and which is carried by support means 41, 42 mounted on the bottom plage 10. The main purpose of the support 40 is to receive a contained 1 having a sealing or closure element mounted thereon, and to hold the container in position until the support body 6 is moved by the cylinder 11 to the operative position and has clamped the container against the rotor 14. The illustrated embodiment includes at least one nozzle 43 through which a stream of cooling air is directed, from a source of cooling air (not shown), against the outside of the container 1, more specifically against the location on the container at which it co-operates with the welding device 35. The object of the nozzle is to prevent overheating of the material in the container 1, so that the collar 4 on the sealing or closure element is melted by means of the welding device.

In the illustrated embodiment, the diameter of the central hole in the rotor 14 through which the welding device 35 is inserted is smaller than the inner diameter of the cylindrical container. As will be seen from FIG. 4, the device 35 has a curved active welding surface 44, the radius of curvature of which is somewhat smaller than that of the cylindrical container 1. In the illustrated embodiment, when the container is clamped in its working position, the centre axis of the shaft 33 is located beneath the centre axis of the container 1 at a distance A therefrom (FIG. 2), and thus by suitable dimensioning of the distance A' (FIG. 4) between the centre line of the shaft 33 and the highest point of the surface 44 the welding device 35 can be moved into the container 1 through the central opening of the rotor 14. This insertion takes place with the welding device 35 in its inoperative position shown in FIG. 2, by activating the cylinder 38 and moving the carriage 27 towards the bracket structure 12, the welding device 35 being positioned with its welding surface 44 opposite the collar 4 and spaced therefrom. As soon as the welding device 35 has been moved into the final position in the container 1, air under pressure is automatically supplied to the rotary cylinder 36 and the welding device 35 is rotated through approximately 180° to the position shown in full lines in FIG. 2. The distance A is conveniently so selected that the surface 44 will press strongly against the collar 4 and the end part of the container 1, whereby the end part of the container becomes somewhat elliptical or "pear-shaped", with the major axis of the ellipse extending vertically in FIG. 2.

The welding device 35, which may be made of steel, for example, has a thickness which is preferably greater than the height or thickness of the collar or flange 4, thereby to ensure complete melting of the collar. The initial temperature and heat capacity must be of such magnitude that the temperature greatly exceeds the melting point of the plastics material during the whole of the time in which the working surface 44 is in contact with said plastics material, in order that the plastics can be maintained in a fluid state. The distance of the working surface 44 from the cylinder axis or centre axis of the container sleeve 1 in the contact position of said surface 44 with the collar slightly exceeds the inner radius of the container sleeve 1. The difference, which is preferably one or two millimeters, for example 1.2–1.5 millimeters, causes the aforementioned deformation of the container sleeve and contributes effectively to a positive weld.

As before mentioned the support 40 is V-shaped and the container can thus be deformed by pressing it against the apex of the V in the plate. It should be noted that the support 40 should not abut the container wall opposite the active part of the surface 44 of the welding device 35, since if it does the container wall may burn if the device 35 is excessively heated. It is assumed that the motor 22 is energized and the rotor 14, and therewith the container 1 with the sealing element 2 pressed into the end of said container, will rotate at the same speed as the rotor 14, for example a speed between 800–1600 r.p.m.

FIG. 3 illustrates the final phase of rotation of the welding device 35 against the collar 4. At some later moment the surface 44 is moved to the final position and pressed against the collar 4 with a force such that the container wall is somewhat deformed. As will be seen from FIG. 3 the welding surface 44, seen in the direction of the shaft 33, is chamfered such that the diameter of the leading edge 45 of the welding device 35, as seen in the direction of insertion, is greater than that of the trailing edge 46. Thus, the leading edge 45 will exert the greatest pressing force against the container 1 and the collar 4. The collar 4 will melt immediately upon contact with the hot surface 44, and since the container 1 rotates and the welding device 35 stands still, the whole collar will rapidly melt and the molten material will be moved inwardly of the container through the chamfered surface 44 and, as a result of the rotation of the container, will be moved out, by centrifugal force, in a uniform, continuous covering layer which adheres to the inner wall of the container 1. When the container 1 has an inner coating of a meltable plastics material or is clad with a foil 5 of meltable plastics material, the coating or foil will be melted in a laminar fashion, i.e. an outer layer nearest the melt originating from the collar 4 will be brought, by said melt, to a tacky or molten state and joined with the material from which the collar is made. The outwardly facing outer layer of the foil 5 will be kept at a temperature beneath the melting point of the foil by the cooling fluid from the nozzle or nozzles 43, thereby preventing the said outer layer from melting. This is essential if the container is to be effectively sealed. The aforedescribed welding sequence takes place very rapidly, for example within a period of from 5 to 8 seconds in the case of a container having a diameter of about 85 mm, a collar thickness of about 1 mm, a rotary speed of about 1000 r.p.m. and the welding device 35 heated to a temperature of about 600° C. The plastics material in the collar 4 and the coating or foil 5 when applied have a melting point of about 130° C.

After a given length of time has lapsed, the rotary cylinder is automatically re-activated from a programmed unit (not shown) and turned to its inoperative position, whereafter the cylinder 38 is activated and the carriage moved rearwardly to withdraw the welding device 35 to the position shown in chain lines in FIG. 2.

The fluid ring of plastics material formed in the material of the collar 4 rapidly solidifies, said solidification being accelerated by cooling with cooling air from the nozzle or nozzles 43. The motor 22 is stopped by a signal sent from the programmed unit preferably not until the plastics material has solidified to a solid state or to a highly viscous state. If the motor 22 is stopped at the same time as the welding device 35 is moved from its working position, and thus rotation of the container 1 is interrupted and the centrifugal force ceases the fluid ring of plastics material may become uneven. It is an advantage under all circumstances to maintain the centrifugal force as long as possible, in order that the fluid plastics material is urged radially outwardly.

The aforedescribed embodiment can be modified in many ways within the scope of the claims and the design of the various components of the apparatus depends to a certain extent upon the shape of the sealing or closure. Thus, if the sealing or closure element comprises a flat lid or a bottom having a collar, corresponding to the collar 4, the support body 6 is replaced by, for example, a pressure plate. It is also possible to use support means arranged to grip about the actual container 1 and hold it in position against the rotor 14. The rotor 14 can be replaced by a driving roller or the like arranged to be brought into contact with the outer surface of the container to cause the container to rotate, the other side of the container being supported, for example, by two freely-rotating support rollers. It is also possible to execute the welding operation as a whole with the container axis extending vertically, i.e. with a machine in which the illustrated and described apparatus has been rotated through 90° from the position illustrated in the Figures. The illustrated welding body 35 may be of a type having an internal heating device, for example a gas burner, although heating of the body by means of electric elements is not excluded. Further, the illustrated and described pneumatic cylinders can be replaced by any suitable type of drive means, for example electric motors or the like. In the aforegoing it has been stated that the welding device 35 is rotated into contact with the collar 4. It is also possible, however, to move the device parallel with the shaft 33 in a manner such that the surface of the device 35 is brought into contact with the collar 4. In this case, the rotary cylinder 36 will, of course, be replaced by a mechanism by which the shaft can be moved and the bearing 32 is removed.

It is also possible to hold the welding device 35 stationary in the axial direction and to move the container sleeve 1 with the sealing element 2 above the welding device, which is then brought to its working position in contact with the collar 4 either by rotation, as above described, or by radial displacement towards and against the collar 4.

In the aforegoing it has been assumed that the container 1 has a relatively small diameter, for example a diameter of from 8–10 cm, although the invention can be applied equally as well with containers of much larger diameter, for example oil barrels. In this case it is convenient to use a multiplicity of heating bodies, arranged at a distance from each other to abut the collar 4 of the sealing or closure element 2. In the case of an oil barrel, for example, there may be used 10 to 20 heating bodies which lie uniformly distributed around a circular arc, to ensure that the plastics material in the collar is maintained in a fluid state. In this case, each heating device is arranged on a common holder including, for example, a camming mechanism which, subsequent to the holder having been moved into position in the barrel, cams the respective heating device towards and in contact with the collar.

In certain cases it may be suitable to heat the sealing element 2 to a temperature which lies beneath or close to the softening point of the plastics material. This is particularly suitable when the sealing element comprises a high-density plastics material, which reacts relative slowly when heat is applied thereto. When the plastics material is pre-heated to a relatively high temperature, for example a temperature of 80° C., the plastics material will be melted relative quickly.

I claim:

1. A method of joining to a cylindrical container sleeve (1) a sealing or closure element (2) provided with a circular collar (4) arranged to be inserted into one open end of the container sleeve, into abutment with the inner wall thereof, at least the collar comprising a heat-meltable plastics material, wherein the sealing or closure element is mounted on the container sleeve with the collar in abutment with the inner wall of said sleeve; wherein the container sleeve and the sealing or closure element are rotated around the cylinder axis of said sleeve; wherein at least one heated body (35) whose temperature exceeds the melting point of the plastics material in the collar is pressed against said collar; and wherein the container sleeve is rotated until the plastics material in said collar has melted, whereafter the heated body is removed out of contact with the plastics material and the plastics material is then permitted to solidify.

2. A method according to claim 1, wherein the container sleeve is rotated subsequent to removing the heated body and said rotation is continued until the plastics material has at least become highly viscous.

3. A method according to claim 1 or 2, wherein the heated body is pressed against the collar in a manner such that the container wall is deformed outwardly.

4. A method according to claims 1 or 2, characterized in that the container is rotated at a speed such that centrifugal forces acting on the plastics material causes a substantially uniform ring of fluid plastics material to form.

5. An apparatus for joining a cylindrical container sleeve (1) to a sealing or closure element (2) provided with a collar (4) made of a heat-meltable plastics material, said collar abutting a ring-shaped end part of the inside of the container sleeve, said collar being firmly welded to the container sleeve within said end part by supplying heat thereto, characterized by: means (6,14) for holding and rotating the container sleeve (1) and the sealing or closure element (2) around the cylinder axis of the container sleeve; at least one welding member (35) arranged to be maintained by heated means (39) at a temperature which exceeds the melting point of the plastics material; movement means (27, 33, 36, 38) for moving the welding member into contact with said collar to melt it during rotation of the container sleeve and for moving said welding member (35) out of contact with the molten plastics material after a given interval of time has lapsed.

6. An apparatus according to claim 5, characterised in that said movement means include a carriage (27) which carries the welding member (35) and which is arranged to move said welding member by means of drive means (38) between an inoperative position at a distance from the open end of said container sleeve remote from the sealing or closure element (2) and a working position in contact with said collar.

7. An apparatus according to claim 5 or 6, characterised in that the welding member (35) has a working surface (44) arranged to abut the collar (4); that the welding member (35) is firmly mounted on a rotatable shaft (33) arranged to be rotated by means of a rotary mechanism (36) between a first position in which the working surface (44) is out of contact with the collar (4) and a second position in which the working surface abuts said collar.

8. An apparatus according to claim 7, characterised in that the working surface (44) of the welding member (35) abuts said collar under pressure in said second position.

9. An apparatus according to claim 7, characterised in that in said second position the working surface lies at a distance from the cylinder axis of the cylindrical container sleeve (1), said distance exceeding the inner radius of the container sleeve.

10. An apparatus according to claims 5 or 6, characterised in that the means for holding and rotating the container sleeve include a freely rotatable support body (6) arranged to abut the sealing element (2) and to press said element and the end of said container sleeve (1) remote from said sealing element against a driven rotor (14) having a central opening through which the welding member (35) can pass.

* * * * *